(12) United States Patent
Nightingale

(10) Patent No.: US 8,120,193 B2
(45) Date of Patent: Feb. 21, 2012

(54) WIND ENERGY CONVERSION SYSTEM FOR PITCHED ROOF BUILDING

(75) Inventor: Christopher George Edward Nightingale, Singapore (SG)

(73) Assignee: Dragon Energy Pte. Ltd., Singapore (SG)

( * ) Notice: Subject to any disclaimer, the term of this patent is extended or adjusted under 35 U.S.C. 154(b) by 532 days.

(21) Appl. No.: 12/248,023

(22) Filed: Oct. 8, 2008

(65) Prior Publication Data

US 2009/0096218 A1 Apr. 16, 2009

(30) Foreign Application Priority Data

Oct. 9, 2007 (SG) ................ 200716868-5

(51) Int. Cl.
*H02P 9/00* (2006.01)
(52) U.S. Cl. .................... 290/44; 290/55
(58) Field of Classification Search ............ 290/55, 290/44; 415/4.1, 4.2, 4.3, 4.5, 182.1; 60/398; 454/16, 18, 19, 900, 186; 52/219, 218, 199, 52/198, 173.3, 40, 173.1, 173 R; 416/198 R, 416/244 R
See application file for complete search history.

(56) References Cited

U.S. PATENT DOCUMENTS

| | | | | |
|---|---|---|---|---|
| 4,021,135 | A | * 5/1977 | Pedersen et al. | 415/208.2 |
| 4,508,973 | A | * 4/1985 | Payne | 290/55 |
| 6,841,894 | B2 | * 1/2005 | Gomez Gomar | 290/55 |
| 2004/0237524 | A1 | * 12/2004 | Thiagarajan et al. | 60/641.8 |
| 2005/0201855 | A1 | 9/2005 | Fan | |

FOREIGN PATENT DOCUMENTS

| | | |
|---|---|---|
| DE | 2847672 A1 | 5/1980 |
| DE | 3049624 A1 | 7/1982 |
| DE | 9314187 U1 | 12/1993 |
| DE | 19644890 A1 | 4/1998 |
| DE | 20001636 U1 | 5/2000 |
| DE | 20100512 U1 | 5/2001 |
| EP | 1830062 A | 9/2007 |
| GB | 2431696 A | 5/2007 |
| GB | 2440264 A | 1/2008 |
| JP | 2003-065206 A | 3/2003 |
| JP | 2005-207288 A | 8/2005 |
| WO | WO 01/57397 A1 | 8/2001 |

OTHER PUBLICATIONS

International Preliminary Report on Patentability, mailing date Apr. 22, 2010, for corresponding International Application No. PCT/SG2008/000393.
European Search Report, dated Apr. 9, 2009, for corresponding European Application No. EP 08008493.
Singaporean Search Report and Written Opinion, mailing date Dec. 23, 2009, for corresponding Singapore Application No. SG 200716868-5.

\* cited by examiner

*Primary Examiner* — Tho D Ta
(74) *Attorney, Agent, or Firm* — Intellectual Property Law Group LLP

(57) ABSTRACT

A wind energy conversion system for a building comprises one or more wind powered turbines, a pitched roof structure having a first pitch on which the turbines are mounted, and a cover supported on the pitched roof structure above the turbines. The cover has a second pitch that is less than the first pitch. The cover and roof structure together create a wind tunnel that directs wind to flow through the turbines. Cowlings are also provided for each of the turbines. Each cowling surrounds an upper portion of a corresponding turbine. The cowlings are aerodynamically shaped and configured to concentrate air flow across or through a wind rotor of its respective turbine. The cowlings extend in a vertical direction between the cover and the roof structure.

6 Claims, 2 Drawing Sheets

WIND ENERGY CONVERSION SYSTEM FOR PITCHED ROOF BUILDING

CROSS-REFERENCE TO RELATED PATENT APPLICATION

This application claims the benefit of Singapore Patent Application No. 200716868-5, filed on Oct. 9, 2007, the disclosure of which is incorporated herein in its entirety by reference.

BACKGROUND OF THE INVENTION

1. Field of the Invention

The present invention relates to a wind energy conversion system for a building.

2. Background

It is well known to use wind to drive a rotor or turbine to convert wind power into alternate forms of power and/or otherwise drive various machines. It is also known to use wind driven turbines on a roof of a building for providing electricity to the building. An example of such a system is disclosed in International publication no. WO 01/57397. This document discloses an elongated wind turbine having an axis of rotation which appears to extend for the entire length of the roof and in a direction transverse to a direction of airflow through the turbine.

It is to be understood that, if any prior art publication is referred to herein, such reference does not constitute an admission that the publication forms a part of the common general knowledge in the art, in Australia or any other country.

SUMMARY OF THE INVENTION

According to one aspect of the present invention there is provided a wind energy conversion system for a building comprising:
- one or more wind driven rotors configured to convert wind energy to an alternate form of energy;
- a pitched roof structure having a first pitch on which the or each rotor is mounted; and,
- a cover supported by the pitched roof structure above the or each rotor, the cover having a second pitch less than the first pitch.

In one embodiment, the pitched roof structure comprises a ridge region in which the or each rotor is mounted, and wherein the cover extends to opposite sides of the ridge region.

The or each rotor may have an axis of rotation parallel to a direction of flow wind through each rotor. The wind energy conversion system may further comprise a cowling for each rotor, each cowling surrounding a corresponding rotor and having open opposite ends directing air flowing up the pitched roof structure to flow through the rotor.

The wind energy conversion system may further comprise a gutter supported by the pitch roof structure and beneath the rotors.

The wind energy conversion system may further comprise two electrical generators coupled with each rotor wherein respective generators are driven by opposite ends of a drive shaft rotated by the rotor, each generator producing electrical energy when the rotor is caused to rotate by the action of air flowing through the rotor.

These and other embodiments of the present invention are further made apparent, in the remainder of the present document, to those of ordinary skill in the art.

BRIEF DESCRIPTION OF THE DRAWINGS

An embodiment of the present invention will now be described by way of example only with reference to the accompanying drawings in which.

DETAILED DESCRIPTION OF SPECIFIC EMBODIMENTS

Figure 1:
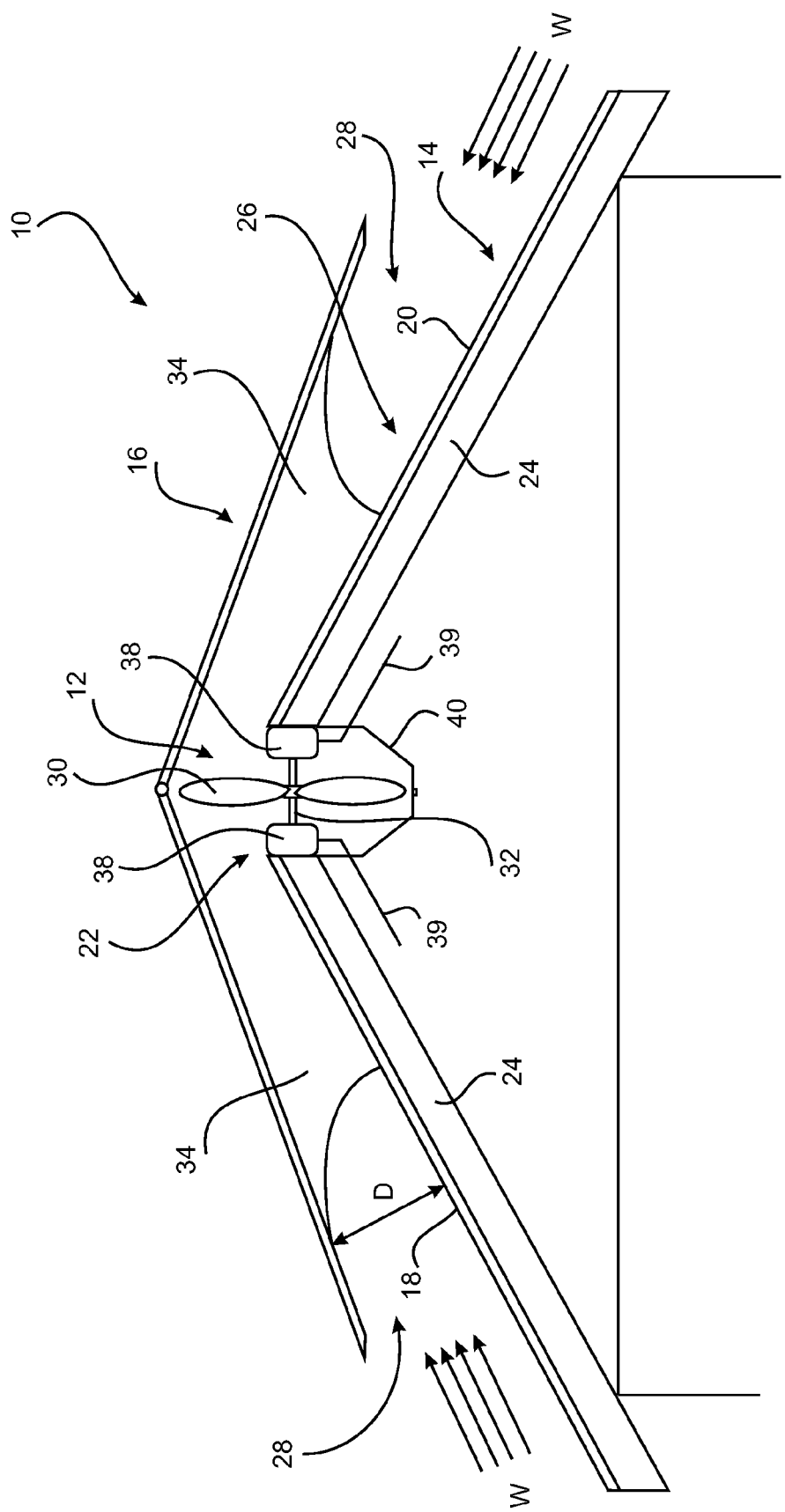
FIG. 1 is an end view of a wind energy conversion system in accordance with a first embodiment of the present invention; and, FIG. 2 is a partial side view of the system shown in FIG. 1.
Figure 2:
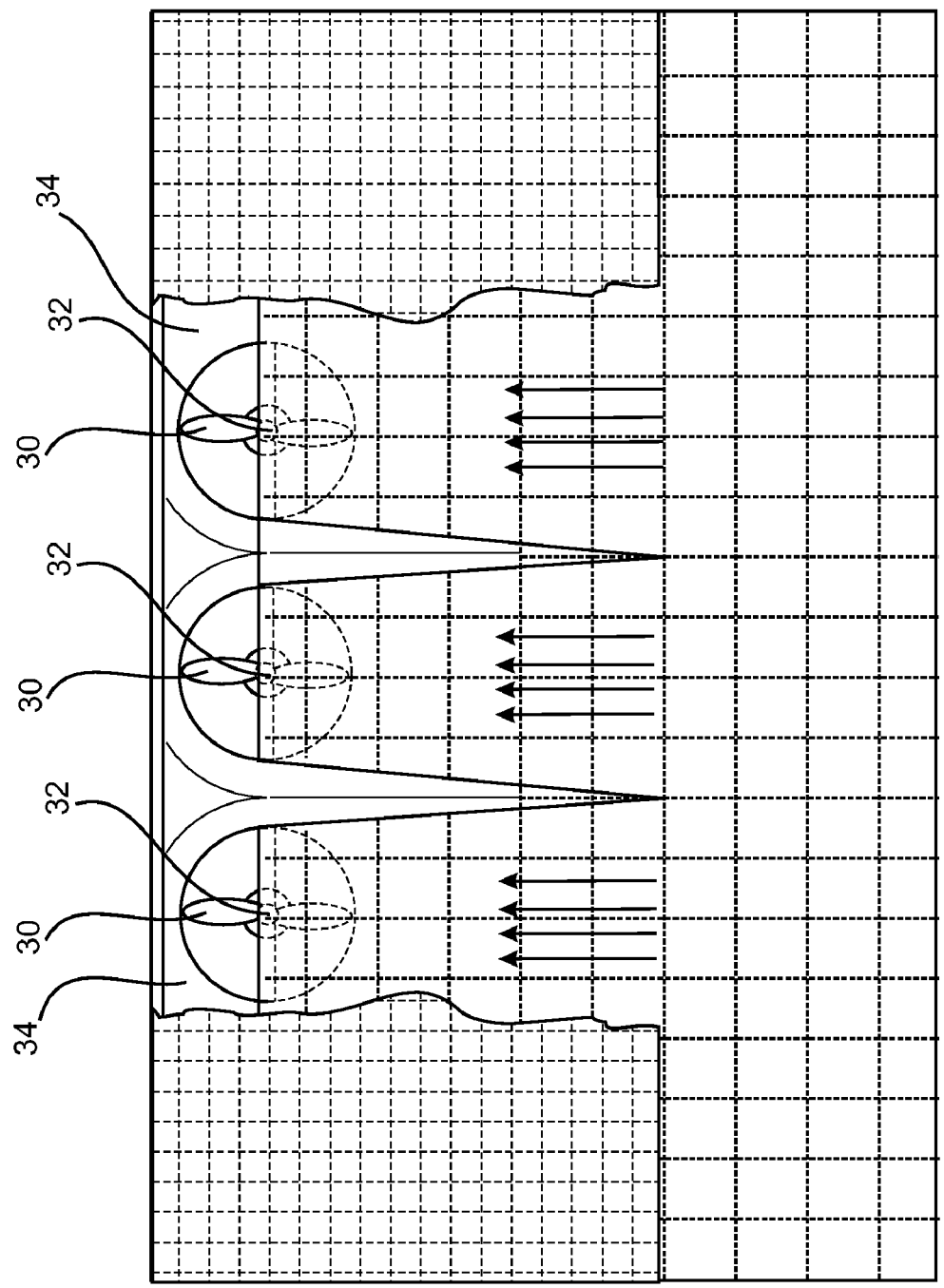

Referring to the accompanying drawings, a wind energy conversion system 10 for a building comprises one or more wind powered turbines 12, a pitched roof structure 14 having a first pitch on which the turbines 12 are mounted, and, a cover 16 supported on the pitched roof structure 14 above the turbines 12. The cover 16 has a second pitch that is less than the first pitch, i.e. less than the pitch of the pitched roof structure 14.

The pitched roof structure 14 has two sloping sides 18 and 20 that converge toward each other in an upward direction. The turbines 12 are supported on the structure 14 in a ridge region 22 created by and between the converging sides 18 and 20. Other than leaving the crest or ridge region 22 of the structure 14 open for the mounting of the turbines 12, the roof structure 14 is of generally conventional form and configuration and thus will comprise a plurality of roof beams 24 together with rafters, joists and battens (not shown).

The cover 16 overlies an upper portion 26 of the roof structure 14 and extends to opposite sides of the ridge region 22. In effect, the cover 16 and the upper portion 26 of the roof structure 14 create or act as a wind tunnel 28 that directs wind W flowing upwardly on the sides 18 and 20 through the turbines 12.

As previously mentioned, the pitch of the cover 16 is less than the pitch of the roof structure 14 so that the perpendicular distance D between the cover 16 and the upper portion 26 of the roof structure 14 decreases in a direction toward the ridge region 22. Thus, the wind tunnel 28 reduces in cross section area toward the ridge region 22. This has the effect of increasing air pressure and thus air speed through the turbines 12. It will be appreciated that the configuration of the wind tunnel 28 has the effect of directing wind from opposite sides of the structure 14 to flow through the turbines 12.

Each turbine 12 comprises a wind rotor 30 coupled to a drive shaft 32 passing through an axis of rotation of the wind rotor 30. The drive shaft 32, and thus the axis of rotation of the propeller 30 is perpendicular or transverse to a line or direction of extent of the ridge region 22. Thus, the drive shaft 32 is substantially parallel to the direction of air flow through the turbine 12.

To further assist in concentrating the air flow through the turbine 12 the system 10 further comprises a respective cowling 34 for each of the turbines 12. Each cowling 34 surrounds an upper portion of a corresponding turbine 12 extending above the beams 24 and has open opposite ends directing air flowing up the roof structure 14 through the turbine 12. The cowlings 34 are ideally aerodynamically shaped and configured to concentrate air flow across or through the wind rotor 30. In this regard, for example, an inside surface of the cowling 34 may be configured to progressively taper from the opposite openings to a central region in which the wind rotor 30 rotates. Each cowling 34 extends in the vertical direction between an inner surface of the cover 16 and an outer surface of the roof structure 14.

Opposite ends of the drive shaft 32 are coupled to respective generators 38 for generating electricity. The generators 38 can be configured or driven to produce electric current of the same phase which in turn is provided to a power management system (not shown) via electrical cables 39. The power management system can distribute electrical power provided by the generators 38 selectively to a storage device such as batteries (not shown), appliances within a building supporting the roof structure 14 or to a power grid.

It will be appreciated that wind passing through the turbines 12 in opposite directions cause the wind rotors 30 to rotate in opposite directions. Depending on the type of generators 38 incorporated in the system 10, it may be important to maintain the phase of the electric current produced by the generators 38 irrespective of the direction of rotation of the propeller 30. This can be achieved by the provision of gear boxes between the shaft 32 and the generators 38 so that irrespective of the direction of rotation of the propeller 30 and drive shaft 32, the direction of rotation of the rotors (not shown) of the generators 38 remains the same.

A gutter 40 is provided that runs along the ridge region 22 beneath the turbines 12 for catching any water that may be blown through the tunnel 28. The gutter 40 may be plumbed into the rainwater gutter system (not shown) for the roof structure 14.

Now that an embodiment of the present invention has been described in detail it will apparent to those skilled in the relevant arts that numerous modifications and variations may be made without departing from the basic inventive concepts. For example, the turbines 12 are illustrated as being disposed along a ridge region 22 of the roof structure 14. However in an alternate configuration, the turbines 12 may be disposed along either one or both of the sides 18 or 20 of the roof structure 14 and provided with separate covers 16 each of which has a pitch less than the pitch of the roof structure 14, or more particularly, the pitch of the respective side 18 or 20 on which it is supported. All such modifications and variations together with others that would be obvious to a person of ordinary skill in the art are deemed to be within the scope of the present invention the nature of which is to be determined from the above description.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

I claim:

1. A wind energy conversion system for a building comprising:
    one or more wind driven rotors configured to convert wind energy to an alternate form of energy;
    a pitched roof structure having a first pitch on which each rotor is mounted;
    a cover supported by the pitched roof structure above each rotor, the cover having a second pitch less than the first pitch; and
    a gutter supported by the pitch roof structure and beneath the one or more rotors;
    wherein each rotor comprises an axis of rotation parallel to a direction of flow of wind through each rotor.

2. The system according to claim 1, further comprising a cowling for each rotor, each cowling surrounding a corresponding rotor and having open opposite ends directing air flowing up the pitched roof structure to flow through the corresponding rotor.

3. The system according to claim 1, further comprising a cowling for each rotor, each cowling surrounding a corresponding rotor and having open opposite ends directing air flowing up the pitched roof structure to flow through the corresponding rotor.

4. The system according to claim 1, wherein the pitched roof structure comprises a ridge region in which each rotor is mounted, and wherein the cover extends to opposite sides of the ridge region.

5. The system according to claim 4, further comprising a cowling for each rotor, each cowling surrounding a corresponding rotor and having open opposite ends directing air flowing up the pitched roof structure to flow through the corresponding rotor.

6. The system according to any one of claims 1, 4, 2, 3, further comprising two electrical generators coupled with each rotor wherein the generators are driven by opposite ends of a drive shaft rotated by their associated rotor, each generator producing electrical energy when the associated rotor is caused to rotate by the action of air flowing through the associated rotor.

* * * * *